United States Patent [19]
Kielmeyer et al.

[11] Patent Number: 4,835,045
[45] Date of Patent: May 30, 1989

[54] FIBER GLASS BOARD AND METHOD OF MANUFACTURE

[75] Inventors: William H. Kielmeyer, Englewood; Theodore R. Rohweder; Richard J. Ray, Jr., both of Littleton, all of Colo.

[73] Assignee: Manville Corporation, Denver, Colo.

[21] Appl. No.: 211,627

[22] Filed: Jun. 27, 1988

[51] Int. Cl.⁴ .............................................. B32B 15/00
[52] U.S. Cl. ................................. 428/284; 428/285; 428/903; 428/920
[58] Field of Search ............... 418/284, 285, 903, 920

[56] References Cited
U.S. PATENT DOCUMENTS
4,495,238 1/1985 Addetta ........................... 428/903

Primary Examiner—James J. Bell
Attorney, Agent, or Firm—John D. Lister; Cornelius P. Quinn; Fred A. Winans

[57] ABSTRACT

A fiber glass board useful as a form board for lightweight cement and the like is strengthened by providing for the fibers to be predominantly oriented generally parallel to the major faces of the board in directions both parallel to and transversely of the dimension of the board corresponding to the process direction. A downstream conveyor which moves the blanket of fibers through the curing oven moves faster than the collection conveyor, thereby producing a drawing effect on the blanket and causing the desired fiber alignment. A glass fiber mat is applied to one or both major faces of the blanket prior to movement through the oven to provide additional stiffness to the board.

3 Claims, 1 Drawing Sheet

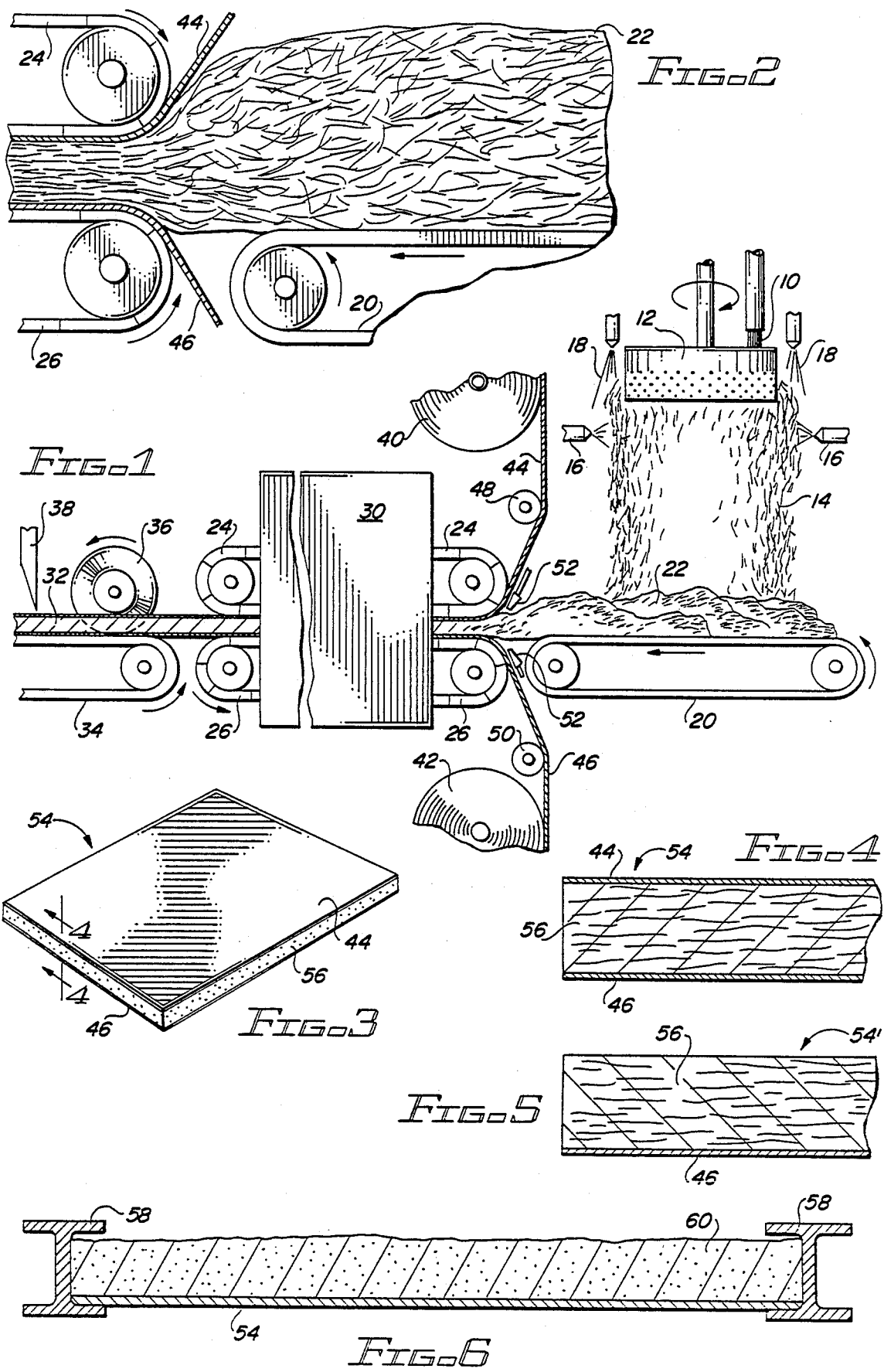

FIBER GLASS BOARD AND METHOD OF MANUFACTURE

FIELD OF THE INVENTION

This invention relates to fiber glass boards. More particularly, it relates to a fiber glass board adapted for use as a form board capable of supporting liquid loads with minimal deflection.

BACKGROUND OF THE INVENTION

Fiber glass boards are sometimes used as form boards to temporarily support poured lightweight concrete or gypsum. When set, the resulting slab functions as a roofing surface or an interstitial limited-access maintenance floor between main floors in a building such as a hospital. Fiber glass boards are well suited for such use. They are lightweight, fire resistant, easy to handle and can be cut to size to fit around obstacles such as pipes, cables and columns. In addition, their resin bonded fibers are strong, lying generally in a direction perpendicular to the applied load and being capable of transferring and distributing the load uniformly. Fiber glass boards also absorb a portion of the water in the concrete or gypsum slurry and thus aid in the setting of this medium. Such boards typically have a thickness of one to two inches and a density of 8 pcf or more.

Although fiber glass boards of the type described have functioned adequately as a form board, it would be desirable to have available a fiber glass board that does not deflect as much under load. Alternatively, if the amount of deflection of current boards is acceptable, such a board could provide a similar function but at a lower density. A major requirement in the manufacture of such a board is to be able to employ the same basic process utilized in manufacturing the current product in order to continue to derive the economic benefits of the process. Any modification of the process required to produce a board having improved strength and stiffness must therefore be compatible with the basic process.

It is known that loads applied to a fiber glass board are distributed within the board from fiber to fiber through resin bonded junctions. For optimum strength, therefore, each fiber should be long enough to intercept and be bonded to two or more adjacent fibers. At a particular binder level, assuming that the binder is strong enough to accept and transfer the fiber load, coarse fibers are preferable to fine fibers because they are straighter and can individually carry more load than fine fibers. Fine fibers, being present in greater quantity than coarse fibers at a given density, produce a greater number of fiber junctions which require a greater quantity of resin.

It would stand to reason that the process used to produce fiber glass form boards should provide predominantly long fibers. Unfortunately, the most economical processes available produce a mixture of long and short fibers which are not conducive to improved load distribution. For example, in the rotary fiberization process, by which molten glass is attenuated through small orifices in the side of a rapidly spinning metal cylinder to form fibers which are sprayed with binder as they fall to a moving collection conveyor, the reduction in rotational speed of the falling mass of fibers can cause long fibers to become entangled in clusters or bundles. The regions between bundles tend to have relatively low fiber content, resulting in areas of weakness in the board. One way of avoiding such areas is to add additional fiber to the collection conveyor to pack these regions. Another way is to produce very short fibers by use of a different process or by use of an air knife on the rotary process. Adequate fiber-to-fiber contact of short fibers, however, requires high fiber loading on the collection conveyor and relatively high binder content. In addition to being less economical than boards containing long fibers, boards comprised of short fibers tend to irritate the skin more and are less flexible.

The most desirable way of producing fiber glass boards having the strength and stiffness required for use as a form board would be to somehow modify existing processes without having to add fiber or produce boards comprised mainly of short fibers.

SUMMARY OF THE INVENTION

This invention provides a method of manufacture which can be carried out on existing production lines with only minor modification. A moving blanket of relatively long, coarse glass fibers, the average diameters of which are primarily in the range of 3.5-8.0 microns, is subjected to forces causing relative movement between fibers of the moving blanket. This action takes place at a point in the process prior to the compressing of the blanket and the curing of the binder. The relative movement is sufficient to cause the fibers in the blanket to be predominantly oriented generally parallel to the major faces of the board in directions both parallel to and transversely of the direction of movement of the blanket. In addition, a fibrous mat is applied to at least one of the major faces of the blanket so as to be located on a major face of the finished board.

In a preferred embodiment the relative movement between fibers is caused by moving a downstream portion of the blanket at a faster rate than the upstream portion. This produces a drawing action on the blanket, which tends to reorient or realign the fibers to make them more parallel to the faces of the board. It has been found that a rate of movement of the downstream portion of the blanket in the range of 3%-10% faster than the rate of movement of the upstream portion will have the desired effect on blankets comprised of relatively long coarse glass fibers.

The faster downstream rate is caused by utilizing two conveyors, the first being a fiber collection conveyor and the second being the conveyor that carries the blanket through the curing oven. By moving the second conveyor at a faster rate than the first conveyor the drawing action of the blanket and relative movement of fibers is brought about.

The application of the fibrous mat to a face of the blanket increases the stiffness of the board. Preferably, a fiber glass mat is applied to a major face of the blanket at the upstream end of the second conveyor so that the mat will not be subjected to movement at different rates of speed. A board having greater stiffness can be produced by applying mats to both faces of the blanket. Binder or adhesive is applied to the interface of the mat and blanket and is cured in the oven to make the mats an integral part of the final board product.

Other features and aspects of the invention, as well as other benefits of the invention, will readily be ascertained from the more detailed description of the invention which follows.

BRIEF DESCRIPTION OF THE DRAWINGS

FIG. 1 is a schematic view of the process of producing the fiber glass board of the present invention;

FIG. 2 is an enlarged sectional view of the blanket as it is drawn into the downstream conveyors;

FIG. 3 is a pictorial view of the fiber glass board of the present invention;

FIG. 4 is an enlarged transverse sectional view of the board of FIG. 3 taken along line 4—4 of FIG. 3;

FIG. 5 is a view similar to that of FIG. 4, but showing a board with a mat on only one face; and FIG. 6 is a transverse sectional view of the board of the present invention showing it supporting a layer of liquid cementitious material.

DESCRIPTION OF THE PREFERRED EMBODIMENT

Referring to FIG. 1, glass fibers are shown being produced by a rotary process of fiberization. A stream of molten glass 10 from a melter or forehearth, not shown, flows into a rapidly rotating spinner 12 the side wall of which contains a great many small orifices. The centrifugal force of the rotating spinner extrudes the glass through the orifices in the form of fibers 14 which are sprayed with binder from spray nozzles 16 and which are forced downward by air jets 18. The fibers drop to a moving collection conveyor 20 which delivers the resulting blanket 22 to the nip of upper and lower conveyors 24 and 26, respectively, which are comprised of connected hot plates 28. The conveyors 24 and 26 move the blanket through an oven 30 where the binder is set. The spacing between the conveyors 24 and 26 determines the thickness of the resulting board 32, which upon exiting from the oven is transferred to a conveyor 34 located just downstream from the end of conveyors 24 and 26. The board 32 may be slit to the desired width by one or more slitters 36 upon exiting from the oven and may further be cut to length by guillotine cutter 38. The process described thus far is typical of existing processes for the continuous production of fiber glass boards and is well known in the art. The various elements of the process referred to accordingly may be of any suitable available type or design.

The invention provides for two modifications to be made to the board making process just described. According to one modification rolls 40 and 42 of fiber glass mat are mounted for rotation so that the mats 44 and 46, respectively, can be fed over suitable idler rolls 48 and 50 into the nip formed by the blanket 22 and the conveyors 24 and 26. Thus, mat 44 extends over idler roll 48 into the nip between the conveyor 24 and the upper surface of the blanket 22, and mat 46 extends over idler roll 50 into the nip between the conveyor 26 and the lower surface of the blanket. Binder is sprayed from suitable applicators 52 onto the interface between the mats 44 and 46 and the upper and lower surfaces of the blanket. It should be understood that although two mats and spray applicators are illustrated, both major faces of the blanket need not necessarily be faced with a mat. It may very well be that a single mat on one of the faces will be sufficient to provide the desired added stiffness to the product, in which case only a single mat would be applied.

According to the other modification to the basic board making process the conveyors 24 and 26 are run so that their linear speed is greater than the linear speed of the conveyor 20. Thus, as shown further in FIG. 2, when the blanket 22 enters the space between the conveyors 24 and 26 it is not only compressed in thickness but is also subjected to a drawing operation whereby the entangled fibers of the blanket are exposed to forces tending to separate them. The difference in rates of movement is not enough to tear the blanket but is sufficient to cause the bulk of the fibers to become aligned or oriented with the faces of the blanket.

A faced board 54 resulting from the described process is shown in FIGS. 3 and 4 to consist of a main body portion 56 faces with mats 44 and 46. If only a single facing mat is applied the board appears as in FIG. 5, wherein board 54' is shown with only the bottom face covered with a mat 46.

Referring to FIG. 6, the board 54 is typically used as a form board by supporting its side edges on suitable support members such as beams 58. Truss bars and reinforcing screen may also be employed in a manner well known in the art, but have not been shown for the sake of clarity. Light weight concrete or gypsum 60 is then poured over the upper surface of the board and is supported by the board as it cures.

Although the results of these process changes are apparent, as determined in tests run on the product, the manner in which the process changes function is not fully understood. With respect to the facing operation, it is believed that the mat on the board face which serves as the bottom of the board in use reinforces the board in the area of highest tensile loading. It is also believed that the mat on the face which serves as the top of the board in use inhibits fiber separation and buckling due to lateral compression. For the mats to be effective in providing stiffness to the major faces of the board the additional binder or adhesive added to the interface between the mats and the blanket should be in the range of 0.25%–1.0% of the weight of the finished board.

With respect to the drawing operation which causes relative movement of the fibers within the blanket, the fibers tend to be oriented into planes parallel to the board faces, which is believed to minimize the occurrence of low density regions between fiber bundles. The increase in the rate at which the blanket is drawn into the curing oven may vary but should be in the range of 3%–10% greater than the rate of movement of the fiber collection conveyor. The preferred increase should not be less than that which produces fiber orientation parallel with the board faces, as observed visually in the board edges. Any less increase than this produces a more flexible bonded fibrous mass that puts the burden of rigidity on the fibrous mats. A drawing action which is too severe, on the other hand, tends to align the fibers in the direction of processing, which substantially reduces the strength of the board in the cross-processing direction and may reduce the width of the bonded blank from which the boards are cut.

Tests were conducted by supporting one-inch thick boards 5–7 feet in length and 24 or 32 inches in width on a one-inch ledge along their perimeter, and pouring a liquid load of gypsum-cement, gypsum or water on their upper surface. The measured deflection corroborated calculations based on the theory that board deflection, given a standard processing method, board direction and size, is inversely proportional to the product of the modulus of elasticity (E) and thickness cubed ($t^3$). Thus according to the theory any increase in $Et^3$ in all board directions over that of a standard board represents an improvement in board performance under load. Testing indicates that between thicknesses of 0.5 and 2.25 inches the product of Et3 in a given board direction is constant for a particular weight per unit area of board. It also indicates that imposing a slight oven draw on the uncured fiber in the manner described above yields a higher value of Et3 than conveying the fiber blanket into the oven at the same speed as the collection conveyor. Application of a fibrous mat, preferably a chopped fiber glass strand mat, on the bottom surface of the board in use increases board stiffness. The combination of the two is especially effective as the thickness of the board is increased. Still improved performance was noted when mats were applied to both major faces of the board.

The average diameter of the glass fibers in the board of the invention is in the range of 3.5–8.0 microns, the binder content is at least 7% by weight of the board, the density of the board is at least 6.5 pcf and the thickness of the board is in the range of 0.5–2.25 inches. The tear strength of the fibrous mat, whether used on only one face or both faces of the board, should be at least 60 pounds per 3 inches of width of the mat. Although the invention is not limited to the use of any particular type of binder or adhesive, standard urea phenolic binder was found to produce good results.

Obviously, changes to the various parameters of the board and mat may be made within the ranges indicated, so long as the basic steps of drawing the blanket in the manner explained and applying a mat to at least one of the faces of the board are carried out.

It should now be understood that the invention is not necessarily limited to all the specific details of the preferred embodiment but that changes to certain features of the preferred embodiment which do not affect the overall basic function and concept of the invention may be made by those skilled in the art without departing from the spirit and scope of the invention, as defined in the appended claims.

What is claimed is:

1. An improved fiber glass board capable of supporting a liquid load at minimal deflection, comprising:
   a main body portion and a fibrous mat integrally bonded to a major surface of the main body portion;
   the main body portion comprising bonded glass fibers having an average diameter in the range of 3.5–8.0 microns, a binder content of at least 7% by weight of the board, a density of at least 6.5 pcf, and a thickness in the range of 0.5–2.25 inches;
   the tear strength of the mat being at least 60 pounds per 3 inches of width of the mat; and
   the fibers in the main body portion of the board being predominantly oriented generally parallel to the major faces of the board in directions both parallel to and transversely of the length of the board.

2. An improved fiber glass board according to claim 1, wherein the board comprises two fibrous mats, each integrally bonded to opposite major faces of the board.

3. An improved fiber glass board according to claim 1, wherein the mat is comprised of bonded glass fibers and wherein the binder in both the main body portion and the mat is a urea phenolic binder.

* * * * *